May 28, 1946.　　　　　C. REID　　　　　2,400,951
MANUFACTURE AND TREATMENT OF ANIMAL AND VEGETABLE MATERIALS
Filed Dec. 23, 1943
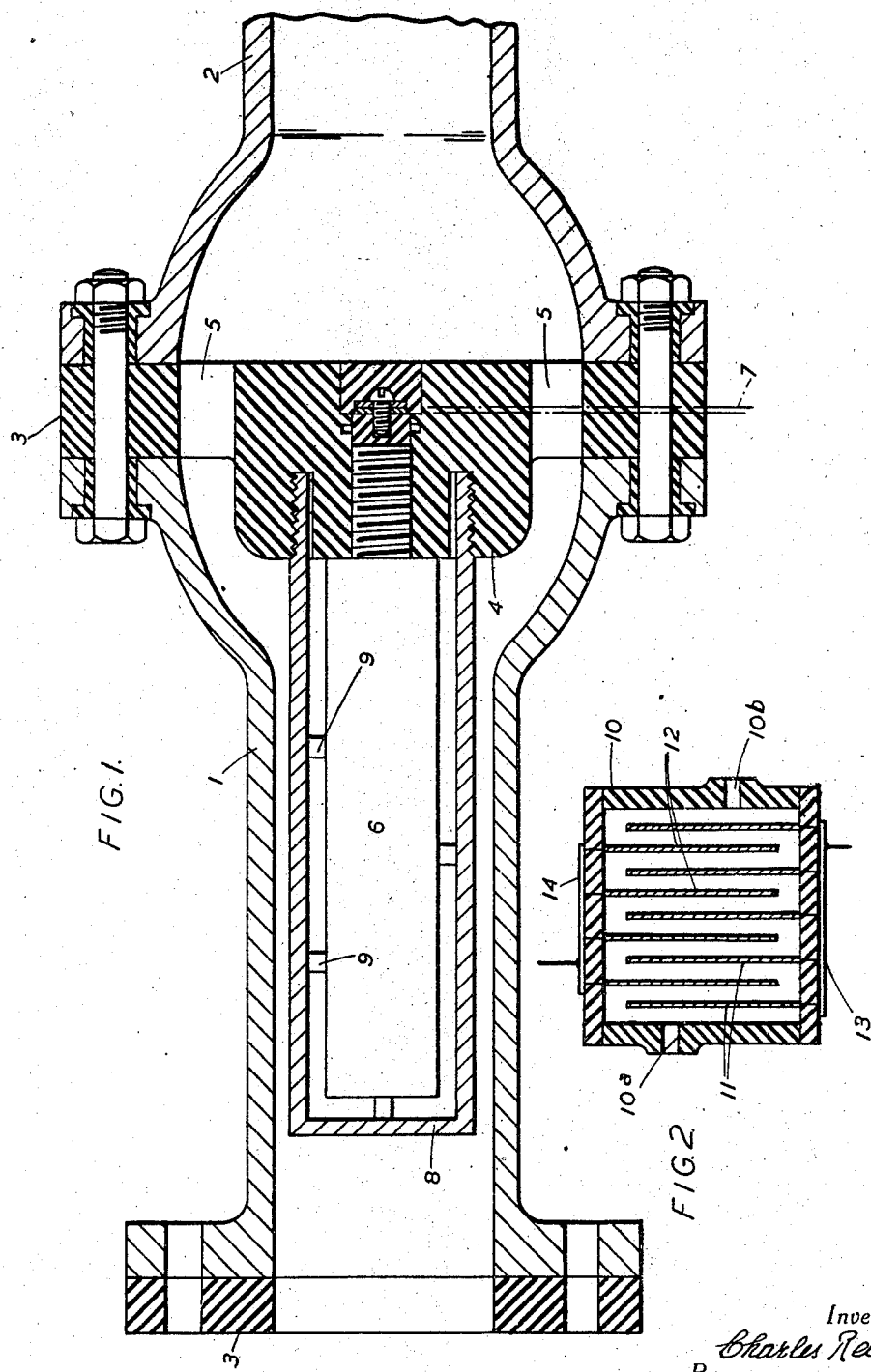
Inventor
Charles Reid
By Walter Gumal
Attorney.

UNITED STATES PATENT OFFICE 2,400,951

MANUFACTURE AND TREATMENT OF ANIMAL AND VEGETABLE MATERIALS

Charles Reid, Edgware, England

Application December 23, 1943, Serial No. 515,454
In Great Britain February 18, 1943

2 Claims. (Cl. 99—221)

This invention relates to the treatment of materials of vegetable and animal origin which are to be used subsequently for industrial purposes, or for medical or dietetic processes, and has for its object the increasing of the available vitalising energy in those materials so that the final products from such subsequent processes are correspondingly more valuable. The invention includes both a direct treatment of the materials themselves, and also an indirect treatment as by dispersing them in liquid media which have themselves been treated and are able to transfer some or all their added energy to the dispersed particles. Some of the results aimed at by the treatments are (a) improving the material's power of chemical reaction with other materials, (b) preventing or retarding bacterial or other decomposition in the materials, (c) increasing or preventing the loss (during processing) of desirable natural qualities such as taste, aroma, medical and tonic properties and bio-physical or bio-chemical properties and (d) increasing the physical strength of the final products, this last having particular reference to such materials as rubber, paper and the like.

The invention is based upon a two-fold hypothesis namely (a) that an atom in a vegetable or animal substance can and does function as a condenser or accumulator, that is, that the atom can be made to receive a charge of energy and to give up that charge, without losing its identity; and (b) that the presence of such an added charge in an atom, creates a stress or tension in the inter-atomic medium between that atom and the nearest other atoms, or conversely that an increased stress or tension in the inter-atomic medium between any two near-by atoms results in an increase of charge or potential or vitality in at least one of those atoms themselves. Further, the hypothesis contemplates that the charge received by an atom may be either an addition to the normal or natural charge, or merely a replacement in whole or in part of a normal charge previously given up, or both. This hypothesis, applied to the treatment of vegetable and animal materials at a particular stage in a sequence of operations as set out below, may be regarded as the principle of the invention. It is recognised, of course, that the conceptions of atoms as having nuclear and orbital constituents and as being detached units spaced in a continuous medium is an arbitrary attempt to visualise current atomic theories not capable of direct demonstration by observation and/or experiment, and that the reciprocal phenomena of an atom receiving and giving up a charge of energy on the one hand, and of the inter-atomic medium having a consequent increase or decrease of stress or tension, on the other hand, may be due to the gain and loss (respectively) of orbital electrons in the atom, or to the displacement of electrons from one energy level or orbit to another or to the polarisation of dipoles, or may be due to some other sub-atomic disturbances not yet fully understood. I have found, however, as a matter of observable fact, that my invention does have the effect of increasing and prolonging the latent energy-content of the animal and vegetable materials treated thereby, and whether treated directly, or treated indirectly by being added to a pre-treated carrier medium.

I have formed the belief that the capacity of the atoms of animal and vegetable materials to receive and give up a charge of energy, with consequent variation of surrounding stresses is associated with what is popularly referred to as "life source." Certain it is, that materials coming from a healthy life source have greater latent atom energy for chemical reaction, etc., than have those of the same kind coming from unhealthy life sources; and it is equally certain that my invention is capable of improving materials from unhealthy sources so that their energy index is at least on a par with that of the materials from healthy sources.

With regard to the increase of local electronic tension in the inter-atomic space, and its corresponding reaction of increasing the energy content of the atoms, it may be stated that vitamins and enzymes are found to be active (or at the least much more active) in the higher ranges of such tension, their activity progressively decreasing as the tension decreases, whilst bacteria are active only in the lower ranges of such tension (their activity increasing as the tension decreases). The present invention has for one of its aims the elimination or substantial reduction of any susceptibility of vegetable and animal materials to destructive bacterial action or putrefaction, and the provision or substantial increase of an aptitude for activation of vitamins, enzymes and the like constructive agencies.

The purely industrial applications of the present invention will fall into two main groups, in one of which the materials will be treated so as to have their greater atomic energy used for merely physical purposes such as in preventing the coagulation of sediment in boilers, or in facilitating the separation of materials in extraction processes; and in the other of which the materials will be treated so as to have their greater atomic energy used to promote, or prolong, or accelerate chemical reaction. This latter group will include the treatment of animal products (including blood) for use as manures and fertilisers. Apart from these purely industrial uses of the invention, a subsidiary group will include other applications such as in the manufacture of medicines, foods and beverages, the materials in such cases being treated so that, when eventually in the living organism (e. g., the human body) they will have a greater effect both in physical and in chemical reactions with that organism, because of the greater available energy previously imparted to them by the process of this invention.

In the first of the said main groups of industrial applications, the invention, as is hereinafter set out more fully, may be applied inter alia to the preparation of vegetable extracts already known as retarders of scale-formation in boilers and other hot-water apparatus, not only with the object of improving the extraction process in the manufacture of the preparations, but of prolonging the activating effect of the extracts when in the boiler water etc., and thus increasing the anti-scaling effect. In the second of said main groups, the invention may be applied to industrial chemical processes which hitherto, in some instances, appear to be frustrated or blocked for apparently unascertainable reasons. I have now deduced that such frustration is due to a premature expenditure of atomic energy in the materials being reacted, and that the application of my invention, by increasing or replacing that vitalising energy, allows the partially-complete reactions to continue.

The present invention is involved in the preparation and uses of extracts from vegetable and animal sources, and comprises any method of preparation of those extracts which includes, in the order stated, the following steps: (a) washing the original materials, (b) bruising them (the term "bruising" including crushing, grinding and disintegration), (c) subjecting them to an extraction process, and (d) during the extraction process, subjecting them to the influence of an electric or electro-magnetic field produced in an apparatus designed as a condenser and defined as follows. The field is to be one generated directly or indirectly by a continuous or a non-continuous current, i. e., a direct current (smooth or pulsating) or an alternating current (with or without rectification) and is to be of a strength such as is found by experiment in each particular case not to produce acidity of a destructive nature or destroy life-building properties in the extracted materials, during the period of treatment, or, if natural creative acidity is already present, not to change that acidity from a life-building to a life-destroying type, the presence or absence, or increase or decrease of acidity in each case being gauged by any recognised test such as the pH test. The field may be set up by either one side only or both sides of the current source. For example, one side only of an A. C. generator may create intermittent charges on electrode surfaces in contact with the materials.

This strength of current, which is to be ascertained for particular cases, may be found by trial and error. By way of illustration it may be stated that, although water, if subjected to a sufficiently strong direct current tension, will electrolyse, and although the electrolysis becomes weaker and eventually ceases as the strength of the current tension is gradually decreased, there is a point in the scale of current values at which the tension in the inter-atomic medium in the water and the corresponding atomic energy cause a stabilising change to occur in the salts or other matter suspended in the water, which change causes the matter deposited as the treatment proceeds to remain as an energised sludge having atomic repelling force, instead of cohering into a hard scale or deposit as is the case at other points in the scale of current values. Similarly, in using the process of the present invention, the value of the current tension will be regulated until that range is discovered in which the potential in the inter-atomic space and the corresponding atomic energy causes the suspended particles in the treated liquid to exhibit the maximum potential change as denoted by the fineness of deposit. It will usually be found that at such strength of tension and energy, the greater portion, if not the whole of the energy applied to the materials as current is absorbed by the materials as a charge on the atoms. The testing of the energy content of the materials may be carried out with the use of an apparatus such as that referred to in British specification No. 551,645 or U. S. A. Patent No. 2,076,964.

The useful range of current tension is limited and can be compared with the temperature range in the human body which is limited to a normal temperature of 98.4° F. with a maximum variation of 7° F. above and below the normal. This limits the physical temperature between life and death. In a similar manner a limited range of vitalising energy controls stability of suspensions and their usefulness for life-building processes.

As the potentials required to make the process effective are weak, and as, with a normal direct current, there is usually a slight admixture of alternating current, due inter alia to irregularities in the generators, the present invention may utilise a normal direct current, with means applied for arresting the D. C. whilst allowing the small amount of A. C. to pass. The best results, however, are obtained from a rectified A. C. current of low value, or from a smooth D. C. current such as is produced by a low voltage battery or accumulator.

The souring, putrefaction and decay of animal and vegetable materials is invariably accompanied by the formation of harmful acids. The chemical reactions involved in such phenomena as souring, putrefaction and decay are due to natural tendencies to attain a zero equilibrium between the energy potentials of the several reagents concerned, and the progress towards such zero equilibrium may be gauged by the degree to which harmful acidity, or variation of acidity as denoted by standard test is present. This phenomenon of approach to equilibrium is accompanied by an increase of insoluble content and a decrease in the Brownian movement. If the energy potentials arrive near to zero equilibrium, and have only slight difference between them, the ability to re-act with surrounding or added substances is correspondingly lowered, not probably, because of the actual or approximate equilibrium per se, but because the higher potentials and corresponding tension in the inter-atomic medium have been brought down to lower levels thereby increasing the difficulty of energy units (e. g., electrons) passing from one atom to another. My invention is designed to prevent such lowering of the higher potentials, thereby maintaining and in some cases increasing the ability of the materials to react with, or to impart energy to other substances with which they are brought into contact.

It is known that liquid substances extracted from materials of animal, and vegetable origin deteriorate as time passes, some rapidly (e. g., milk) and others more slowly (e. g., fruit juices), and such deterioration, at least in its earlier stages, is denoted by a loss of piquancy of taste, or aroma, of resistance to bacteria, and of nutriment value, together with a retrogression from a solvent phase, through a colloidal phase, to actual deposit of the dispersed substance. I have ascertained that these deleterious changes, which represent an increased resistance to the passage of electrons from atom to atom, can be expressed in terms of a falling in the pH value of the liquids, and an increase in insoluble content, and that extracts obtained according to my invention, that is, whilst under the influence of the said field, both retain their original value (with corresponding ability to maintain the tension in the inter-atomic medium and to pass electrons from atom to atom) and also retain their original proportion of soluble content (resulting in a greater resistance to deterioration accompanied by retention of food value) for a considerably longer period than do extracts of the same kind not obtained according to my invention.

I have formed the conclusion that the keeping power, or lack of keeping power, of vegetable and animal materials, and the power to remain in solvent or colloid form without sedimentation and with the retention of food value, is dependent upon the energy content of the atoms and the tension in the medium between the atoms in those materials, this conclusion being supported by the fact that extracts from healthy materials have greater keeping power than have those from unhealthy materials. I am convinced, also, that the reasons why extracts prepared according to my invention have the increased keeping power, as compared with extracts obtained by other means, is that by my invention the atoms are vitalised and charged with additional energy.

The application of the electric or electro-magnetic field to the materials, whilst the extraction process is going on may, for example, be carried out in an apparatus according to either of the figures of the accompanying drawing, or in an apparatus according to that disclosed in British Specification No. 487,595.

The extracts obtained may continue to be subjected to the influence of the field immediately after their extraction from the original materials, either in the same vessel or in a separate vessel into which they may drain for that purpose.

The several stages of the process may include a sterilisation process, and this, if adopted, will preferably be immediately before, or in the early stages of the extraction process, except in the case of fermented liquids or the like, when sterilisation takes place after my process has been completed.

In the accompanying drawing, two typical examples of apparatus for carrying out the invention are illustrated:

Fig. 1 is a longitudinal sectional elevation of a device for insertion in a pipe line and embodying a central internal electron-discharging member; and Fig. 2 is a cross-sectional elevation of an alternative device for a similar purpose, the device itself constituting a condenser in which the stream of liquid operates as a di-electric.

Referring first to Fig. 1 a hollow unit 1, flanged at both ends, is adapted for insertion in a pipeline 2, a part only of which is shown, along which pipe line the liquid to be treated is to flow. The unit 1 is electrically insulated from the pipe line by the substantial insulating packing pieces 3, but is electrically connected to earth at any convenient point. The packing piece 3 may be of any suitable material, the larger packing 3 being of disc form with a central hub or boss 4 on one side, and having a number of through openings 5 which allow the liquid to flow through it. Projecting from the central boss 4, is an electrode element 6 of any suitable metal, such as iron or steel, to which is to be connected by the lead 7 one side of a source of alternating potential, which potential becomes impressed on the electrode. The electrode element 6 may be a condenser.

Surrounding the electrode element 6, but spaced away from it is a shield 8, composed of a metal, such as stainless steel, which cannot be ionised by the weak currents used, and adapted to function as the electron distributor to the liquid, being in contact with the electrode by means of the internal projections 9.

Referring now to Fig. 2, a box or chamber 10 is provided, having inlet and outlet ports 10a and 10b and in such box are two sets of plates 11 and 12. The box is made from an insulating material such as a moulded plastic. The liquid enters at the ports 10a and then follows a tortuous path between the respective plates until it reaches the outlet 10b. The plates 11 are all connected to a busbar 13 which in turn is connected to one side of a source of alternating potential (not shown) whilst the plates 12 are all connected to a busbar 14 which in turn is connected to earth.

According to a further feature of the invention, between the washing and bruising stages, the original materials may be passed through a complete or partial fermentation process and in some cases the electrical treatment may be commenced during that fermentation process and continued uninterruptedly into the extraction process.

In one practical embodiment of the invention already tried out, the electrical treatment is applied to the extraction of an anti-scaling compound for boilers and other hot-water apparatus. Such a compound is an extract from vegetable materials usually of the tannin series, but can be of any vegetable or animal extract having a capacity to act as an activator to enable the atomic energy content to be increased, and which when added to boiler water counteracts harmful acidity in the water and raises the vitalising value of the water suspension to prevent the formation of scale; the salts, etc., in the water being deposited as an energised or vitalised sludge instead of as a non-activated incrustation. When the extract is first prepared the atoms of the material have sufficient surplus latent energy to impart energy to the atoms or molecules of the salts or other substances present in the water, in such a way as to set up (or, if already present to increase) repelling forces between them, thereby preventing coagulation and incrustation. When this compound is prepared by a process including my invention, the energy-content of the atom is found to be increased, thus producing a capacity for a prolonged useful life of the fully vitalised compound when subsequently added to the boiler water, as well as increasing its atomic vitality or intensity. Moreover, the unused compound, when prepared according to my invention can be stored for a much longer time without bacterial or mould action being set up. The stability of the tannin product may be measured by adding a substance such as potato juice which is subject to deterioration. If, for example, potato juice is added to the tannin liquid suspension which has not been treated according to my invention, instability becomes apparent in 69 hours. If now the same quantity of potato juice be added to the same quantity of the same tannin liquid suspension which has been treated according to my invention, no instability becomes apparent at the end of 93 hours nor for a long period thereafter. Other vegetable extracts of a different chemical series may be utilised for the same purpose, and my invention is equally applicable to them.

The invention may be further characterised in that materials obtained by an extraction process characterised as above defined, are subjected to a further and similar electrode treatment whilst in use, this treatment again being limited in that it is not to produce but is to counteract harmful acidity in the extracts.

In other practical embodiments of the invention, the treatment is applied to the extraction of essences, juices and the like for use as foods, or beverages, or for use as medicines. In some cases, the invention can be employed merely in the manufacturing processes, whether the final products are cooked or similarly treated or not, whilst in others it will be employed also during final cooking or similar preparation processes.

A certain amount of work is being done at present on the dehydration of foods, mainly for the purpose of reducing transport costs for foods, and of prolonging the useful storage life of foods. Most of the methods attempted involve some kind of extraction process, but it is noticeable that the dehydrated foods, when prepared for consumption, have a certain "flatness" of taste, and a loss of distinctive aroma. It is my belief that the extraction processes used call for the expenditure of energy from the atoms of the foods, with consequent loss of food value, and that the methods of preparation (cooking, etc.) far from restoring that energy, call for the giving up of further sub-atomic energy and further loss of food value. This loss of energy, is, in my opinion, the cause of the said "flatness" loss of piquancy, and diminished nutrient value. In many cases, according to the hitherto known art, the product cannot be stored unless oxygen is extracted from the container and replaced with an inert gas such as nitrogen, probably due to the fact that the energy state and degree of inter-atomic tension has fallen into the region where bacterial action is possible.

According to a still further feature of my invention, the electrical treatment is applied in an extraction process (preceded by washing and bruising) which forms a part of a dehydration process. Food materials thus prepared, retain a large proportion of their original sub-atomic energy, and solubility and therefore in their final state approach more nearly in nutrient value and in piquancy, etc., to the natural unhydrated foods. Moreover, food substances thus prepared, according to this still further feature of the invention, may be subjected to a repetition of the electrical treatment during a re-hydration or cooking process (or both) when being prepared for use.

The following synopsis shows the general lines upon which the invention can be applied for dietetic, medicinal or industrial purposes:

(a) The first stage comprises the washing of the vegetable or animal materials in water, to remove superficial contamination, which can be done in a washing plant of any suitable known form.

(b) Next, the materials are bruised, cut and shredded for example between stainless steel rollers and cutters, or in a pulping or shredding machine such as is used in the manufacture of wood pulp, and during this bruising process the materials may be heated (e. g., steamed) or otherwise treated to retard oxidation and to facilitate the subsequent extraction process. The washing process ensures that all non-vegetable and non-animal matter is removed, whilst the bruising process results in a preliminary loosening of the inner structure of the materials, and in the exposure of a greater area for influence by the subsequent treatments.

(c) In the third stage, which in some cases may be omitted, the bruised material is arranged in layers of say from 1" to 3" in thickness and is fermented. If, in the ultimate product, flavour and taste are to be of primary importance, the fermentation is prolonged, whereas if it is medicinal or food value or alcoholic properties in the ultimate product which are to be of first importance, the fermentation period is shortened, or is omitted altogether. Alternatively, a balance between taste and flavour on the one hand, and food value on the other hand, can be struck by suitably grading the period of fermentation.

(d) Next, the bruised, or bruised and fermented materials, are subjected to a sterilising process, which also in some cases may be omitted, and are then passed to an extraction process. The sterilisation may be effected by means of steam, and in such case the steam pressure may be utilised to transfer the materials to the extraction plant. During the extraction, the materials are agitated in the presence of water and/or other liquid with or without heating and with or without a sub-atmospheric or super-atmospheric pressure, or alternating cycles of higher and lower pressures, and during this agitation the whole mass is passed one or more times through an apparatus for example similar to that shown in Figure 1 of the accompanying drawing or that set forth in British Specification No. 487,595 or in a similar apparatus, whether moving or stationary, for the purpose of increasing the potential energy of the ultimate constituent structure of the material. The impartation to the extractable material of an increased energy and/or the replacement of the energy lost in the phenomenon of separation by which the extraction goes on, results in a greater amount of extract being obtainable than would be possible without such imparted energy, and also results in that extract which is obtained being of a better quality, capable of longer storage without corruption, and of more potent reactability than those extracts obtained without the use of my invention. It is found that with some substances of delicate structure such as grapes, mangoes and mangosteens, it is an improvement to reduce the temperature of the materials, say to 40° F. or lower, during the agitation and energising process, but for other articles a temperature of 100–200° F. is ordinarily the best for good results. The completion of the energising and extracting process is ascertained by test samples. The strength of current applied to the apparatus, when using a 50 cycle single-phase A. C. may be for example between 100 and 700 micro-amps, at a pressure of say 2 millivolts to 2 volts. These values will depend on the material being treated, on its rate of flow through the apparatus, and on the respective areas and propinquity of the electrode surfaces.

It will readily be understood that, when only one side of the source of alternating current is connected with the liquid under treatment, there will be an intermittent discharge from the electrode. The strength to be aimed at for this discharge is the maximum which the liquid can absorb. Any excess beyond that maximum will pass to the walls of the unit and thence to earth, and may be detected by the placing of a suitable measuring instrument in the earth lead. If there should be temporary variations in the energy-absorbing capacity of the fluid, any resulting temporary excess of discharge will pass to earth and will not have any heating or other adverse effects in the liquid.

(e) When the extraction process is complete, the larger particles are removed by coarse filtering or straining, and the remainder, in suspension, is passed to a colloid mill so that the non-liquid matter still remaining is reduced to a dispersion of colloid dimensions in the liquid phase. Preferably, the coarse-filtered or strained material is passed through an alternating or direct field on its way to the colloid mill and for such purpose may pass for example through a second apparatus according to Figure 1, or an apparatus according to Figure 2 of the accompanying drawing. Also, the solid matter kept back by the coarse filter or strainer will be suitably pressed so as to yield as much liquid matter as possible, which liquid matter will be added to the filtrate. The coarse filtered material can be transformed into a flowable liquid form, re-energised by my process and passed through the colloid mill for use in the preparation of a second grade product, or for addition to the original filtered liquid.

(f) The liquid material now obtained is again subjected to my electronic energising treatment in an apparatus according to Figures 1 or 2 and is then passed to a concentrating and/or drying process. During concentration, which will mainly consist of the evaporation of water, the temperature should not exceed 212° F. and should preferably lie between 150 and 200° F. After concentration, and before drying (if drying is resorted to) the concentrate is again subjected to the electrical treatment, e. g., in the apparatus of Figures 1 or 2. Drying may be carried out on heated drums in known manner, with or without subsequent grinding to produce a powdered product.

Alternatively, the energised extract, whether having been passed to a colloid mill or not, as required, and having been subjected to the subsequent electronic treatment referred to above, is thereupon converted to a powder immediately by being discharged as a fine spray into a heated atmosphere within a closed chamber. Drying then takes place instantaneously without loss of atomic energy by fermentation and/or oxidation.

In either case, the resulting powder may be toasted to give it an added flavour, and it may be moisture-conditioned, preferably to give it a moisture content of between 3% and 7% by weight. The powders are now stored for a period with the minimum access of oxygen, say by being kept in air-evacuated containers, or in the presence of an inert gas such as nitrogen, or by being packed tightly together in cylinders. During this stage and within a period of 2 or 3 months, the full natural flavour and aroma are produced through the agency of a slow post-fermentation.

A powdered product obtained from potatoes by the above method could be made into starch; a product from beets could be used for sweetening purposes; and a product from grapes could be used in the manufacture of wines at a place remote from the vineyards.

In a particular example carried out according to the above scheme, a juice obtained from a portion of a red cabbage, according to my invention was, at intervals thereafter compared with an extract obtained by ordinary means from another portion of the same cabbage. The comparisons were made by using the universal pH indicator, which is a colour comparison, and the results may be tabulated as follows, the "treated" specimen being that prepared according to my invention and the "untreated" being that obtained without the use of my invention:

| Test hours | pH value treated specimen | pH value untreated specimen |
| --- | --- | --- |
| 0 | 8.5 | 8.5 |
| 16 | 8.5 | 8.5 |
| 38.5 | 8.5 | 8.5 |
| 62.5 | 8.5 | 8.0 |
| 75 | 8.5 | 7.0 |
| 86.5 | 8.5 | 6.7 |
| 99 | 8.0 | 6.5 |

In another example, also according to the above scheme, shredded turnip (the turnips having previously been washed) was placed in an enamel pan with water and brought to a temperature of 150° F. after which the shredded turnip was subjected to a repeated compressing operation to extract the soluble matter. During the compressing operations the material was subjected to an electrical charge such as obtains with an apparatus according to Figure 2 of the accompanying drawing and the process was repeated, with a fresh supply of turnip each time, but with different strengths of electronic tension, and the results may be tabulated as follows:

| Current in milli-volts | First signs of instability | Gasification began | Coagulation completed | Gasification ended |
| --- | --- | --- | --- | --- |
| 2 | After 20 hours | After 56 hours | After 104 hours | After 128 hours. |
| 3 | After 36 hours | do | After 128 hours | Do. |
| 4 | After 50 hours | After 80 hours | do | Do. |
| 5 | After 80 hours | do | do | After 152 hours. |
| 6 | do | do | After 152 hours | After 176 hours. |
| 7 | do | do | | Do. |
| 8 | After 56 hours | After 70 hours | do | Do. |
| 9 | After 36 hours | After 56 hours | After 128 hours | After 152 hours. |
| 10 | After 20 hours | do | After 104 hours | After 128 hours. |

The current used for these two examples was a 50 cycle, single-phase A. C. of from 2 to 10 milli-volts tension, and passing 250–500 microamps. The rate of flow of the material over the electrodes was ½ gallon per minute or thereabouts, and the area of electrode in contact with the material 75 square inches. The plates of the condenser could be movably mounted so as to operate as stirrers and agitators in the liquid, and in such case care taken to avoid their contacting each other.

In a further example to determine the relative efficiencies of the electrical application when using different currents, turnip juice was subjected to different types of electrical tension and its period of stability measured, as follows:

| Electric tension at millivolts | First signs of unstability |
|---|---|
| Untreated turnip juice | After 20 hours. |
| Treated with a field generated by condenser A. C. | After 55 hours. |
| Treated with a field generated by straight D. C. | After 80 hours. |
| Treated with a field generated by rectified A. C. | After 93 hours. |

The following are further particular illustrations of the use of the invention:

(a) Grape juice, at any stage in the manufacture of wine, but preferably in the early stages, is subjected to treatment in an apparatus according to Figure 1 or 2 of the accompanying drawing, and thereby has its latent electronic energy raised to the highest level. This impartation of energy makes up for any shortages resulting from a poor "vintage year" and/or from premature plucking from the vine, and also replaces energy lost in the preceding stages of transport or manufacture. Under present methods of manufacture, the final quality of the matured wine depends upon the residual energy content of the atomic suspension at the commencement of the maturation period, after a loss of energy during the preceding fermentation process. By my process, such residual energy may be kept up to normal, or if reduced can be restored to normal before or during the fermentation process.

(b) In the cane-sugar industry, the quality of the sugar depends upon the latent electronic energy in the cane after its severance from the roots. Some of such energy is lost through premature fermentation during transport and there is a further energy loss during cutting and crushing. By my process, this loss of energy is made up, and the final sugar product has an increased sweetness and solubility as a result. Either the juice extracted from the can can be treated directly, as in an apparatus according to Fig. 1 or 2, or there could be added to the cane, after or during each of the successive stages of crushing, a weak mixture of juice and water which has itself been treated in such an apparatus. My invention also dispenses with or reduces the necessity for adding a neutralising substance such as milk of lime, and therefore eliminates the harmful salts which such a substance would form. The invention is equally applicable to the beet sugar industry.

(c) In the tea industry, after the leaf has been withered or sterilised, cut or rolled or otherwise treated to burst or breakdown the leaf cells and so release the juice within the leaf fabric, and after a fermenting period to produce the desired properties of colour, taste or flavour, the juice is totally pressed from the leaf. To conserve the medicinal properties, the juice may be extracted prior to the fermenting period.

After the juice is extracted, it is treated according to my invention to vitalise the suspension and after a maturing period (which may be omitted) the juice is spray dried to produce a vitalised powder which has increased capacity to produce aroma and increased flavour and taste. The vitalised powder is then highly compressed into cylinders in which state post fermentation develops the properties of aroma, and flavour and taste in 2–4 months storage or transport. The vitalised tea powder will remain fresh for years in its compressed state. As required, the compressed vitalised powder is broken down and transformed into any suitable form (e. g., tablet or loose powder) for presentation to the public.

(d) In the rubber industry, rubber latex is treated according to my invention, preferably as soon as it is received at the factory from the plantation, to restore the latent atomic or globular electronic energy of the suspension as denoted by the Brownian movement, not only to replace the electronic energy lost during collection and transport, but also to make available energy to strengthen the subsequent manufacturing (mixing and vulcanising) processes.

The advantages accruing from the adoption of this invention are many. In particular it may be stated that (a) transport and storage space may be reduced (25 cubic feet of cabbage treated as in the above example can be reduced to ⅖ths of a cubic foot); (b) activated protective films can be formed on the inner face of boilers, etc., to prolong the activity of those installations, as well as reducing running costs; (c) food products in vitalised powder form may be transported to any part of the world without risk of climatic interference, and without loss of taste, aroma and nutrient or medicinal value; and (d) the long storage life of the treated products makes possible a more practical control of economic factors such as supply and demand, as well as permitting a more efficient preparation against national shortages due to emergencies.

What I claim is:

1. The method for the treatment of vegetable and animal materials which includes, in the order stated, the steps of washing the initial materials, bruising them, subjecting them to an extraction process, and during the extraction process subjecting them to the influence of an electric field and of a tension such as is found by experiment in each case not to increase acidity in the treated materials, said tension being produced from a source of not over twenty millivolts.

2. The method for the treatment of vegetable and animal materials which includes, in the order stated, the steps of washing the initial materials, bruising them, subjecting them to an extraction process, and during the extraction process subjecting them to the influence of an electric field and of a tension such as is found by experiment in each case not to increase acidity in the treated materials, said tension being produced from an alternating current source of not over twenty millivolts.

CHARLES REID.